March 3, 1964 H. W. PATTON 3,123,764

MAGNETIC AMPLIFIER AND CONTROLLING DEVICE

Filed Jan. 15, 1960

*INVENTOR.*
HENRY W. PATTON
*BY* Henry W. Patton

United States Patent Office 3,123,764 Patented Mar. 3, 1964

3,123,764

MAGNETIC AMPLIFIER AND CONTROLLING DEVICE

Henry W. Patton, Novi, Mich., assignor to Acromag, Incorporated, Detroit, Mich., a corporation of Michigan Filed Jan. 15, 1960, Ser. No. 2,778
4 Claims. (Cl. 323—56)

Figure 2:
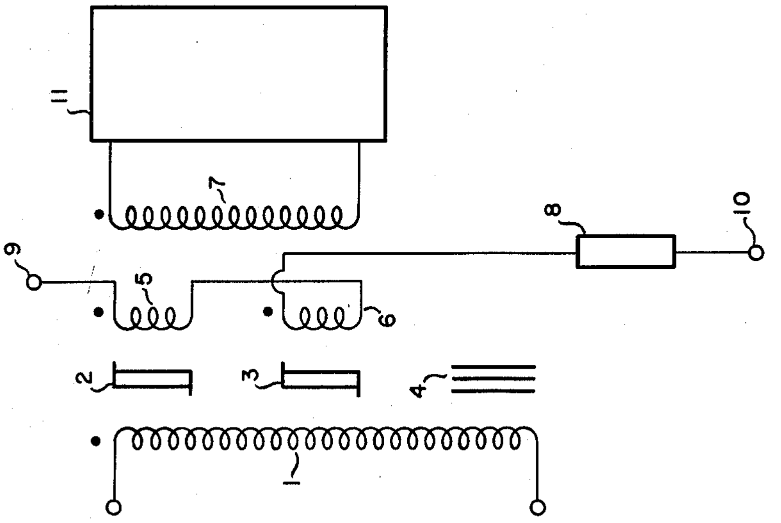

This invention relates to amplifiers and controlling devices designed to respond to direct current signals or to low frequency alternating current signals, and more particularly to those constructed with magnetic circuits, diodes, resistors, and other elements in the manner of magnetic amplifiers. The construction techniques herein described, yield magnetic amplifying and control arrangements exhibiting improved construction, control and amplifying properties.

Magnetic circuits offer advantages of reliability, almost indefinite life, freedom from maintenance, rugged construction, and low power consumption over vacuum tube circuits. Magnetic amplifiers and their associated families of control devices have no filaments to burn out, they require no warm up time, and they operate without depreciation of characteristics despite substantial fluctuations in supply voltage and frequency. Moreover, these magnetic control devices are known for their reliability, robustness, and their capabilities of withstanding severe shock, vibration, and temperature variations.

Present magnetic amplifier circuits often use one or more impedance devices connected in series with their input windings to effectively reduce alternating current ripple signals flowing in their input circuits as typified by Elmen's U.S. Letters Patent 1,586,885, issued June 1, 1926. These alternating current ripple currents frequently flow to a considerable degree when these series impedances are not used. In many circuit arrangements these series limiting impedances yield magnetic amplifying and control arrangements wherein large amounts of alternating current signal are kept from flowing in the signal circuits, thus affording better amplifier performance, and minimizing the undesirable effects caused by these ripple signals flowing through the signal sources. Further, the loading influence effects of the signal sources upon the operation of the magnetic control device are reduced substantially by the presence of series limiting impedances in the signal windings. Such series connected limiting impedances used in the signal and bias windings of these magnetic control devices are well known in the art, and the invention herein described relates, primarily, to methods of constructing magnetic control devices embodying improved methods of obtaining the effect of these series connected impedances by using methods of magnetic shunts in combination with various magnetic control circuits.

An object of this invention is to provide a rugged and reliable magnetic control device.

It is a further object of this invention to provide a magnetic amplifier of simplified construction.

It is another object of this invention to provide a magnetic control device with improved signal to noise ratio, and improved signal to drift ratio.

Another object of this inventon is to provide a magnetic amplifier having greater reliability, fewer parts, and fewer soldered connections.

Another object of this invention is to provide a magnetic amplifier with inherent self-shielding characteristics against stray magnetic fields.

Another object of this invention is to provide a magnetic amplifier wherein the effects of one or more separate choke or impedance devices, and one or more signal or bias windings are combined.

Another object of this invention is to provide a magnetic control device wherein the effects of distributed capacitances ordinarily encountered when using separate impedance assemblies are modified substantially.

It is a further object of this invention to provide a magnetic amplifier having less total copper winding resistance than by using separate series connected impedance devices.

It is a further object of this invention to provide a magnetic amplifier with greater power gain, and arrangements wherein the effective input impedances are increased.

It is a further object of this invention to provide a magnetic amplifier wherein a plurality of control signal and bias windings are more easily constructed.

It is a further object of this invention to provide a magnetic control device which can be built and packaged in less space than conventional separate series connected impedance designs of said magnetic control devices.

It is a further object of this invention to provide a magnetic control device which, by its unique construction, can be built at less cost than conventional separate series impedance designs of said magnetic control devices.

Figure 1:
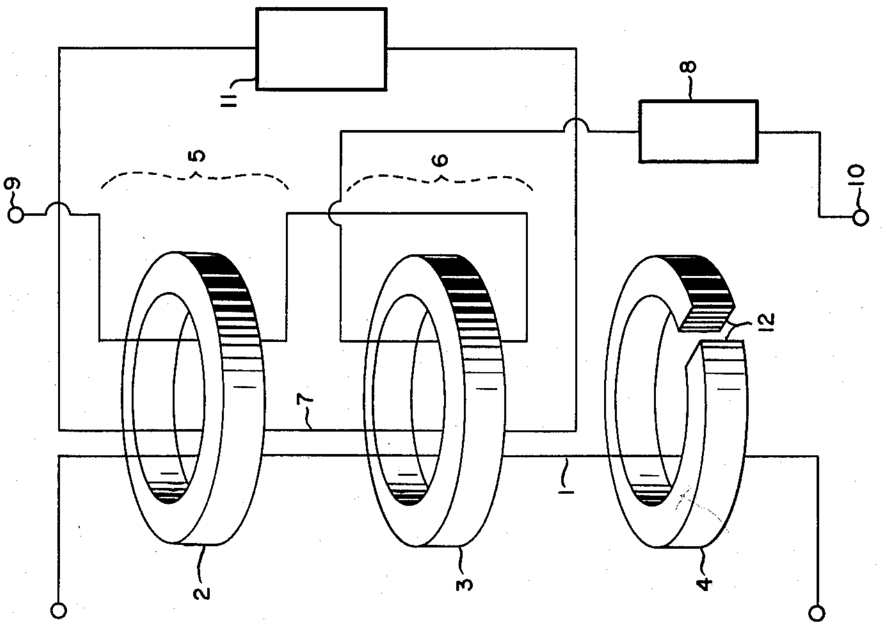

Other objects of this invention will become apparent from the following description taken in conjunction with the accompanying drawings in which:

Referring to FIGURE 1 which is an exploded pictorial schematic representation of the invention, and FIGURE 2 which is a schematic diagram of the invention, signal input 1 links cores 2, 3, and 4. Although all windings shown in FIGURE 1 show but one turn, it is to be clearly understood that this is for illustrative purposes only, and magnetic control devices embodying this invention usually have windings with many turns. Cores 2, 3, and 4 may be made toroidal in structure, this being a well-known manner of constructing magnetic amplifiers and their associated families of control devices. Cores 2 and 3 may be made from high permeability magnetic alloys such as fifty-percent grain oriented nickel-iron alloy known in the trade as "Orthonol" and "Deltamax"; or, these cores may be made from other magnetic materials to yield a variety of properties as may be desired in the finished design. Core 4 acts as a magnetic shunt with respect to signal input winding 1, and this core may be made in several well-known forms such as a pressed permalloy dust core, as a ferrite core, as a coiled strip, as a ring core, or as various forms of laminations, depending on the properties and economics desired in the finished device. It has been found useful, in some versions of magnetic amplifiers embodying this invention, to use magnetic shunt core 4 with an airgap marked as 12 in FIGURE 1. Airgap 12 varies the effective reluctance of the magnetic circuit associated with magnetic shunt core 4. The airgap 12, the physical dimensions of the core, the material used in the core, and the annealing process used during core manufacture, or combinations thereof, can be used to control the reluctance of the magnetic path in core 4 effectively altering the apparent series connected impedances. Differentially series connected windings 5 and 6 link cores 2 and 3 respectively, the dots in diagram 2 indicate winding phasing as is common nomenclature in the magnetics art. Windings 5 and 6 are used to produce magnetic flux oscillations within cores 2 and 3 by connecting an outside source of alternating current power to terminals 9 and 10. Current through these windings is limited by impedance 8 which may exist as a separate component as shown, or this impedance may be embodied within the natural inherent impedances of windings 5 and 6. Winding 7 is a signal output winding, and it functions to couple the differential flux oscillations, which are responsive to control signals in input winding 1, from the cores 2 and 3, to the external load circuit 11. Since cores 2 and 3 do not always undergo exactly the same flux excursions at the same instant of time, it is observed that alternating current ripple signals are induced magnetically into windings 1 and 7. Part of the ripple signal induced into winding 7 is recovered by the external load circuit, 11, as useful output signal, but the ripple signal induced into signal input winding 1 is generally undesired and its presence oftentimes impairs amplifier performance. Many conventional magnetic amplifying and control circuits use arrangements very similar to those shown in FIGURES 1 and 2 except that additional magnetic shunt core 4 is not used. Oftentimes these circuit arrangements without core 4 use a limiting impedance such as a choke or resistor connected in series with the input windings to reduce the induced ripple signal flowing in the said input winding and from flowing in the control signal circuit. In practice, one choke, and/or one winding on a choke, and/or one limiting resistor is required for each signal input and/or biasing winding to minimize these ripple currents. Thus, if for a typical design, it is desired to construct a magnetic amplifier with three signal windings and a bias winding, four separate impedance elements are needed generally to avoid excessive flow of ripple currents in the input circuits. Detailed investigations of such conventional amplifier circuit arrangements show that the distributed capacitance effects of one or more of these ripple reducing impedance elements, and of the control and bias windings give the effect of capacitances, reflected by means of well-known transformer impedance action, across winding 7. This undesired capacitance effect produces the appearance of an alternating current ripple shunt bypass path across winding 7 thereby taking away part of the signal energy intended for the external load circuit 11. It has been observed, occasionally, that an unwanted parasitic oscillation may develop caused in part by this distributed capacitance effect.

To get greater current sensitivity in a given magnetic amplifier design, it is common practice to increase the number of signal winding turns. This, for a given amount of control signal current, increases the ampere-turn effect applied to the cores, and should increase the current sensitivity of the amplifier. Theoretical calculations show that the amplifier's current sensitivity should increase in direct proportion to the number of control winding turns. However, if an experiment is performed with similar amplifier designs which vary by having small and large numbers of control winding turns, it is observed that amplifiers having large numbers of control turns tend to have much less current sensitivity than that predicted by theory. Experimental evidence shows that this reduced gain effect is influenced very substantially by the presence of distributed capacitance in the control and bias windings, and in the series connected impedance windings, all being reflected by transformer action across output winding 7 thereby providing an undesired signal bypass means for the output signal which is not through load circuit 11. In one typical embodiment of the invention as shown in FIGURES 1 and 2, the presence of magnetic shunt core 4 proves a counter electromotive force effect through its change in flux state caused by a very small current flowing through winding 1, and the signal source. By appropriate design, this counter electromotive force, induced in winding 1 by the change in flux state of magnetic shunt core 4, reduces the alternating current ripple current component flowing in winding 1 to a smaller value; and the presence of magnetic shunt core 4 and this winding arrangement gives an effect similar to that of a choke or impedance element connected in series with winding 1. However, the deleterious effect of distributed capacitance which is observed ordinarily when using the separate conventional choke arrangement is substantially reduced. Further, amplifier circuits using the magnetic shunt core, 4, arrangement of this invention as depicted in FIGURES 1 and 2, exhibit current sensitivities which increase almost directly as the number of control winding turns is increased as is predicted from theoretical calculations.

Control winding, 1, in FIGURES 1 and 2, may be one winding as shown, or may be a plurality of separate and different windings for control and/or bias functions in the manner of winding a plurality of such windings as is a common magnetic amplifier construction practice, but without departing from the true intent and spirit of this invention. Further, this magnetic core shunt technique may be applied to may other magnetic amplifier and associated magnetic control circuits using different numbers of cores than the number shown in the appended drawings and this description without departing from the intent and spirit of this invention. Further, while the core structures in the appended drawings and in this specification are of toroidal construction, it is practical to use other forms of magnetic structures incorporating the principles and teachings of this invention.

Although the invention has been described and illustrated in detail, it is to be clearly understood that the same is by way of illustration and example only, and is not to be taken by way of limitation, the spirit and scope of this invention being limited only by the claims appended hereunto.

What is claimed is:

1. A magnetic amplifier circuit comprising a plurality of saturable core members, a power input winding wound upon each of said saturable core members, a signal output winding wound upon all of said saturable core members, an additional non-saturating core member, and a signal input winding wound upon all of said core members so as to be electromagnetically linked with said additional core member, whereby the flux change in said additional core member generates a counter electromotive force in said signal input winding to modify the effects of distributed capacitive currents in said amplifier circuit.

2. The magnetic amplifier circuit of claim 1 wherein said power input windings are connected in series opposition.

3. The magnetic amplifier circuit of claim 1 wherein said additional core member is provided with an air gap to control the effective reluctance thereof.

4. A magnetic amplifier circuit comprising saturable magnetic core means, power input winding means wound upon said saturable magnetic core means, signal output winding means wound upon said saturable magnetic core means, additional core means, and signal input winding means wound upon said saturable magnetic core means and said additional core means, said signal input winding means being electro-magnetically linked to said additional core means whereby flux change in said additional core means generates a counter electromotive force in said signal input winding means to modify the effects of distributed capacitive currents induced in said signal input winding means.

References Cited in the file of this patent

UNITED STATES PATENTS

| | | |
|---|---|---|
| 1,586,885 | Elmen | June 1, 1926 |
| 2,870,268 | Mamon | Jan. 20, 1959 |

FOREIGN PATENTS

| | | |
|---|---|---|
| 204,009 | Australia | Nov. 1, 1956 |